United States Patent
Leventhal et al.

(10) Patent No.: US 7,979,638 B2
(45) Date of Patent: Jul. 12, 2011

(54) METHOD AND SYSTEM FOR ACCESSING DATA USING AN ASYMMETRIC CACHE DEVICE

(75) Inventors: Adam H. Leventhal, San Francisco, CA (US); Brendan D. Gregg, Menlo Park, CA (US); Bryan M. Cantrill, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 571 days.

(21) Appl. No.: 12/060,761

(22) Filed: Apr. 1, 2008

(65) Prior Publication Data

US 2009/0249007 A1   Oct. 1, 2009

(51) Int. Cl.
*G06F 12/00* (2006.01)
(52) U.S. Cl. ......... 711/118; 711/103; 711/113; 711/159
(58) Field of Classification Search .................. None
See application file for complete search history.

(56) References Cited

U.S. PATENT DOCUMENTS

| | | | | |
|---|---|---|---|---|
| 2007/0050548 A1* | 3/2007 | Bali et al. | ................... | 711/118 |
| 2007/0106853 A1* | 5/2007 | Evanchik et al. | ............. | 711/159 |
| 2007/0288692 A1* | 12/2007 | Bruce et al. | ................... | 711/113 |
| 2008/0114930 A1* | 5/2008 | Sanvido et al. | ............... | 711/113 |
| 2008/0155190 A1* | 6/2008 | Ash et al. | ...................... | 711/114 |

* cited by examiner

*Primary Examiner* — Kaushikkumar Patel
(74) *Attorney, Agent, or Firm* — Osha • Liang LLP

(57) ABSTRACT

A system configured to receive a first request for a first datum, query the cache metadata to determine whether the first datum is present in the main memory or the asymmetric cache device (ACD), retrieve the first datum from the main memory when the first datum is present in the main memory, retrieve the first datum from the ACD when the first datum is present in the ACD and not present in the main memory, store a copy of the first datum in the main memory when the first datum is present in the ACD and not present in the main memory, update the cache metadata to indicate that the copy of the first datum is stored in the main memory when the first datum is present in the ACD and not present in the main memory, and retrieve the first datum from the disk when the first datum is not present in the ACD and is not present in the main memory.

18 Claims, 8 Drawing Sheets

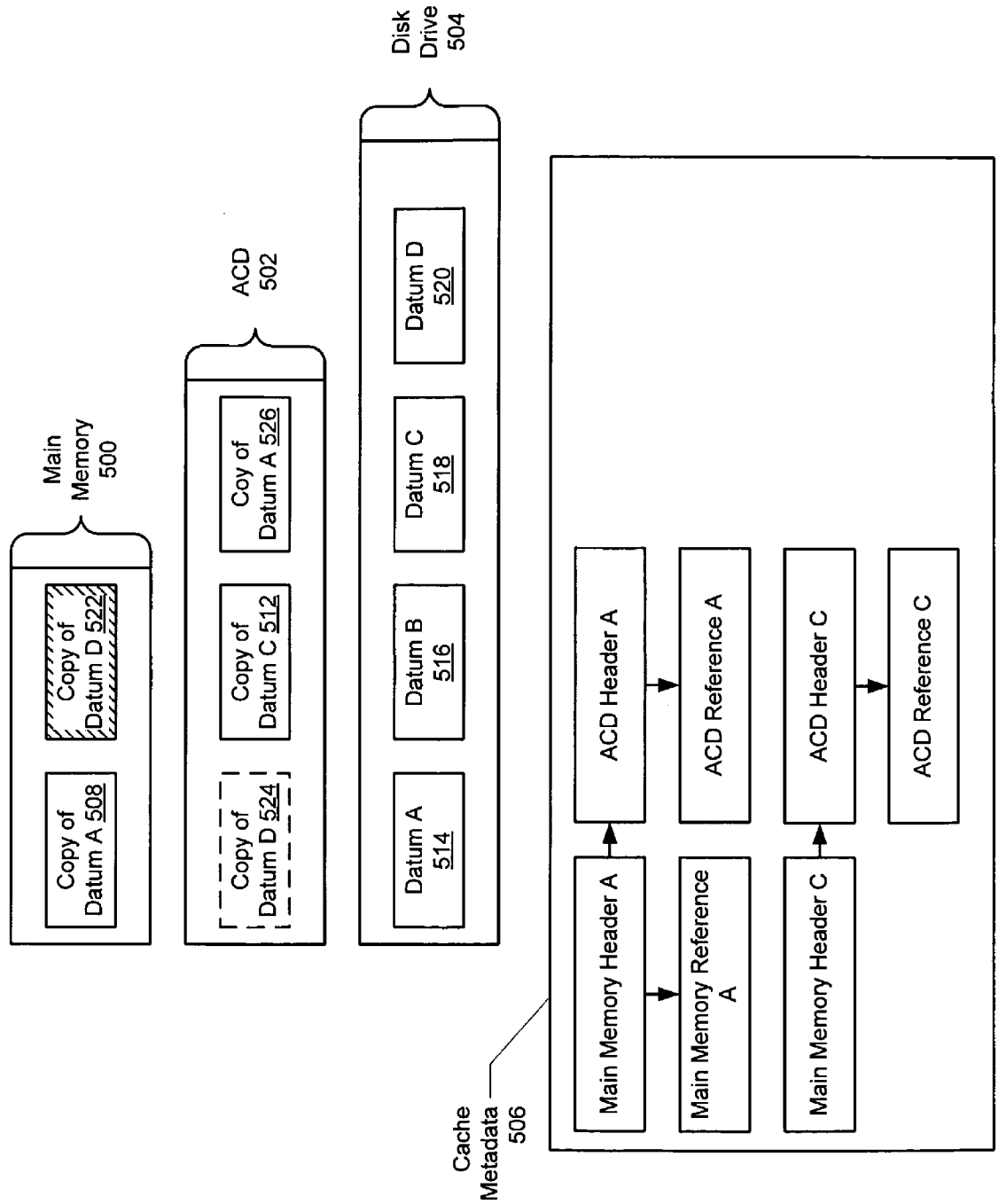

METHOD AND SYSTEM FOR ACCESSING DATA USING AN ASYMMETRIC CACHE DEVICE

BACKGROUND

A typical operating system includes a file system. The file system provides a mechanism for the storage and retrieval of files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system provides management interfaces to create and delete file systems. File systems are typically controlled and managed by operating system parameters.

An application, which may reside on the local system (i.e., computer) or may be located on a remote system, uses files as an abstraction to address data. Conventionally, this data is stored on a non-volatile storage device, such as a disk. To access a file, the operating system (via the file system) typically provides file manipulation interfaces to, for example, open, close, read, and write the data within each file. In order to decrease the time required to read a file from the non-volatile storage device (e.g., the disk), copies of recently accessed files are cached in main memory. Thus, when a request to read a file is received, the file system may first query the main memory to determine whether a copy of the file is cached prior to querying the non-volatile storage. If the file is present in the main memory, the file is read from the main memory. However, if the file is not present in the main memory, the file is retrieved from the non-volatile storage device. The time for retrieval from the main memory is usually significantly less than the time for retrieval from the non-volatile storage device.

SUMMARY

In general, in one aspect, the invention relates to a system. The system includes main memory comprising a cache metadata, an asymmetric cache device (ACD), and a disk. The system is configured to: receive a first request for a first datum, query the cache metadata to determine whether the first datum is present in at least one selected from a group consisting of the main memory and the ACD, retrieve the first datum from the main memory when the first datum is present in the main memory, retrieve the first datum from the ACD when the first datum is present in the ACD and not present in the main memory, store a copy of the first datum in the main memory when the first datum is present in the ACD and not present in the main memory, update the cache metadata to indicate that the copy of the first datum is stored in the main memory when the first datum is present in the ACD and not present in the main memory, and retrieve the first datum from the disk when the first datum is not present in the ACD and is not present in the main memory.

In general, in one aspect, the invention relates to a method for retrieving data. The method includes receiving a first request for a first datum, querying a cache metadata to determine whether the first datum is present in at least one selected from a group consisting of a main memory and an asymmetric cache device (ACD), retrieving the first datum from the main memory when the first datum is present in the main memory, retrieving the first datum from the ACD when the first datum is present in the ACD and not present in the main memory, storing a copy of the first datum in the main memory when the first datum is present in the ACD and not present in the main memory, updating the cache metadata to indicate that the copy of the first datum is stored in the main memory when the first datum is present in the ACD and not present in the main memory, and retrieving the first datum from a disk when the first datum is not present in the ACD and is not present in the main memory.

In general, in one aspect, the invention relates to a computer readable medium comprising executable instructions for execution on a process, when executed the executable instructions perform a method. The method includes receiving a first request for a first datum, querying a cache metadata to determine whether the first datum is present in at least one selected from a group consisting of a main memory and an asymmetric cache device (ACD), retrieving the first datum from the main memory when the first datum is present in the main memory, retrieving the first datum from the ACD when the first datum is present in the ACD and not present in the main memory, storing a copy of the first datum in the main memory when the first datum is present in the ACD and not present in the main memory, updating the cache metadata to indicate that the copy of the first datum is stored in the main memory when the first datum is present in the ACD and not present in the main memory, and retrieving the first datum from a disk when the first datum is not present in the ACD and is not present in the main memory.

Other aspects of the invention will be apparent from the following description and the appended claims.

BRIEF DESCRIPTION OF DRAWINGS

FIGS. 5A-5D show an example in accordance with one embodiment of the invention.

DETAILED DESCRIPTION

Figure 1:
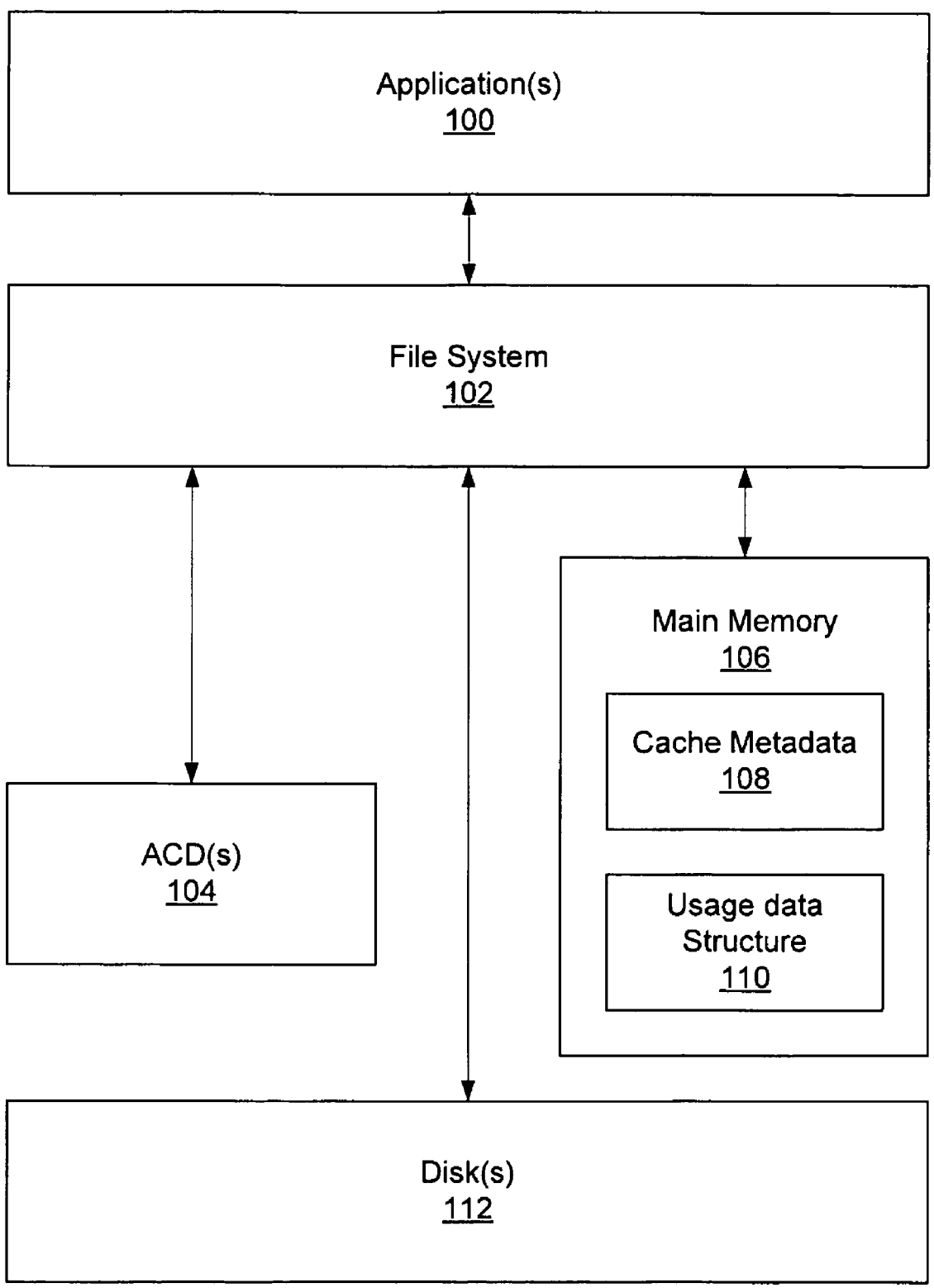
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for accessing data. More specifically, embodiments of the invention relate to a method and system for accessing data using a storage architecture, which includes one or more asymmetric cache devices, main memory and one or more disks.

FIG. 1 shows a system in accordance with one embodiment of the invention. The system includes one or more applications (100) configured to request files from a file system (102). In one embodiment of the invention, the application(s) (100) may be, but are not limited to, local applications (e.g., user-level or kernel-level applications) and remote applications (i.e., applications executing on a system separate from the system on which the file system is executing) connected via a network and communication using a file or block sharing protocol (e.g., Server Message Block (SMB) protocol, Network File System (NFS) protocol, etc.). In one embodiment of the invention, the application(s) (100) interface with the file system (102) through an operating system interface (not shown). In one embodiment of the invention, the file system (102) is configured to receive requests for files from applications (100). The file system (102) converts requests for the files to requests for the data (e.g., the metadata associated with file, data which makes up the file, etc.) corresponding to the file. The file system (102) (or another process) attempts to retrieve the data.

Figure 2A:
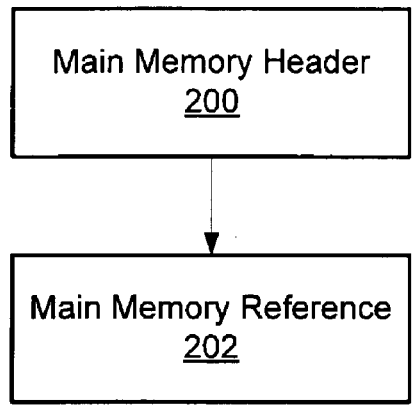
FIGS. 2A-2C show data structures for cache metadata in accordance with one embodiment of the invention.
Figure 2B:
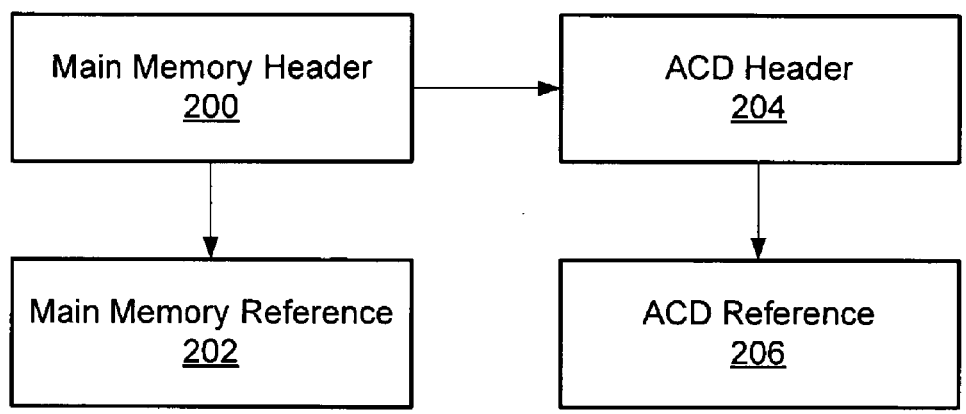
Figure 2C:
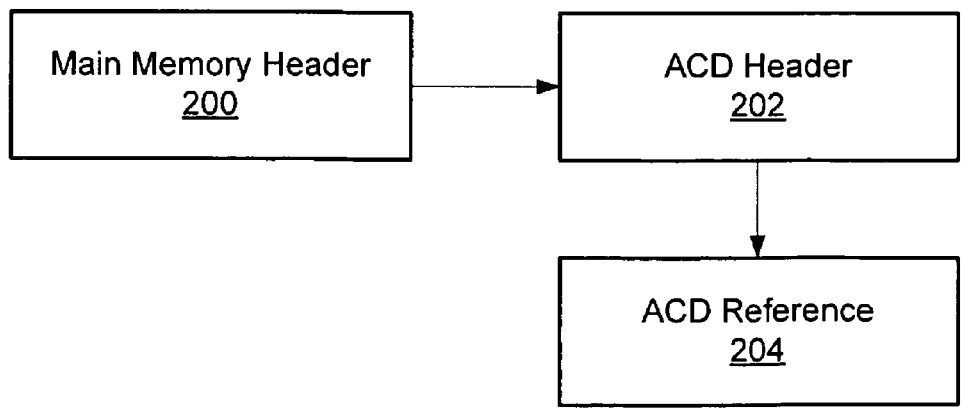

The file system (102) may obtain the data from one or more of the following locations: (i) main memory (106), (ii) asymmetric cache devices (ACDs) (104), and (iii) one or more disks (112). In one embodiment of the invention, main memory is random access memory (RAM). The main memory (106) is configured to store user data (e.g., files). In addition, main memory (106) is configured to maintain cache metadata (108) and a usage data structure (110). In one embodiment of the invention, the cache metadata (108) tracks what data is stored in main memory (102) and what data are stored in the ACDs (104). In one embodiment of the invention, the cache metadata (108) is implemented using one or more linked lists. FIGS. 2A-2C show embodiments of the cache metadata in accordance with one embodiment of the invention.

Returning to FIG. 1, the usage data structure (110) tracks the frequency that each datum is requested. Further, the usage data structure (110) may maintain a list (or equivalent data structure) that includes a listing of all data (or at least references to the data) in main memory in, for example, least frequently requested order (or least recently requested order). Those skilled in the art will appreciate that the list may use any ordering scheme which allows the system to identify which data in main memory is about to be evicted from (or is likely to evicted from) main memory. In one embodiment of the invention, the cache metadata (108) is implemented using one or more linked lists. As a datum in main memory (110) is requested, the order of the datum on the list is updated accordingly. In one embodiment of the invention, the cache metadata (108) and/or usage data structure (110) are located in the main memory (as shown in FIG. 1). In another embodiment of the invention, the cache metadata (108) and/or usage data structure (110) are located in another portion of the system (i.e., cache metadata (108) and/or usage data structure (110) are not located in main memory).

In one embodiment of the invention, each ACD (104) is configured to store data. In one embodiment of the invention, the ACD (104) does not store dirty content and the content of the ACD(s) is not flushed to disk (112). In one embodiment of the invention, each ACD (104) includes memory that is read-biased (i.e., the time for processing a read request is faster than the time for processing a write request). In one embodiment of the invention, at least one ACD (104) in the system includes flash-type memory. Examples of flash-type memory include, but are not limited, non-volatile NOR-type memory and non-volatile NAND-type memory.

In one embodiment of the invention, each disk (112) in the system is configured to store data. In one embodiment of the invention, the disks (112) may include, but are not limited to, magnetic memory, optical memory, or combination thereof. In one embodiment of the invention, the storage capacity of the main memory (106) is less than the storage capacity of the ACD(s) (104), and the storage capacity of the ACD(s) (104) is less than the storage capacity of the disk(s) (112).

FIGS. 2A-2C show data structures for the cache metadata in accordance with one embodiment of the invention. As discussed above, the cache metadata (108) tracks the data stored in main memory (106) and the ACD(s) (104). In one embodiment of the invention, for each datum in main memory (106) and the ACD(s) (104) there is an entry in the cache metadata (108). Further, if the same datum is located in both main memory (106) and the ACD (104), then the entries for each datum are associated. The system is configured to query the cache metadata to determine whether the requested datum is present in both (or either) main memory and the ACDs.

Referring to FIG. 2A, FIG. 2A shows an entry for datum only located in main memory (i.e., there is no copy of the datum in the ACD(s)). In this case, the entry includes a main memory header (200) and a main memory reference (202). The main memory header (200) may be associated with the main memory reference (202) using a pointer. The main memory header (200) includes the information necessary to: (i) associate the entry with the datum and (ii) to locate the entry within the cache metadata. The main memory reference (202) includes the location (e.g., the logical block address) of the datum in main memory.

FIG. 2B shows an entry for a datum located in main memory and a copy of the datum located in the ACD. In this case, the entry includes a main memory header (200) (discussed above), a main memory reference (202) (discussed above), an ACD header (204), and an ACD reference (206). The main memory header (200) may be associated with the ACD header (204) using a pointer. Further, the ACD header (204) may be associated with the ACD reference (206) using a pointer. The ACD (204) includes the information necessary to associate the entry with the copy of the datum. The ACD reference (206) includes the location (e.g., the logical block address) of the copy of the datum in the ACD. FIG. 2C shows an entry for a datum located only in the ACD (i.e., there is no copy of the datum in main memory). In this case, the entry includes a main memory header (200) (discussed above), an ACD header (204) (discussed above), and an ACD reference (206) (discussed above).

Figure 3:
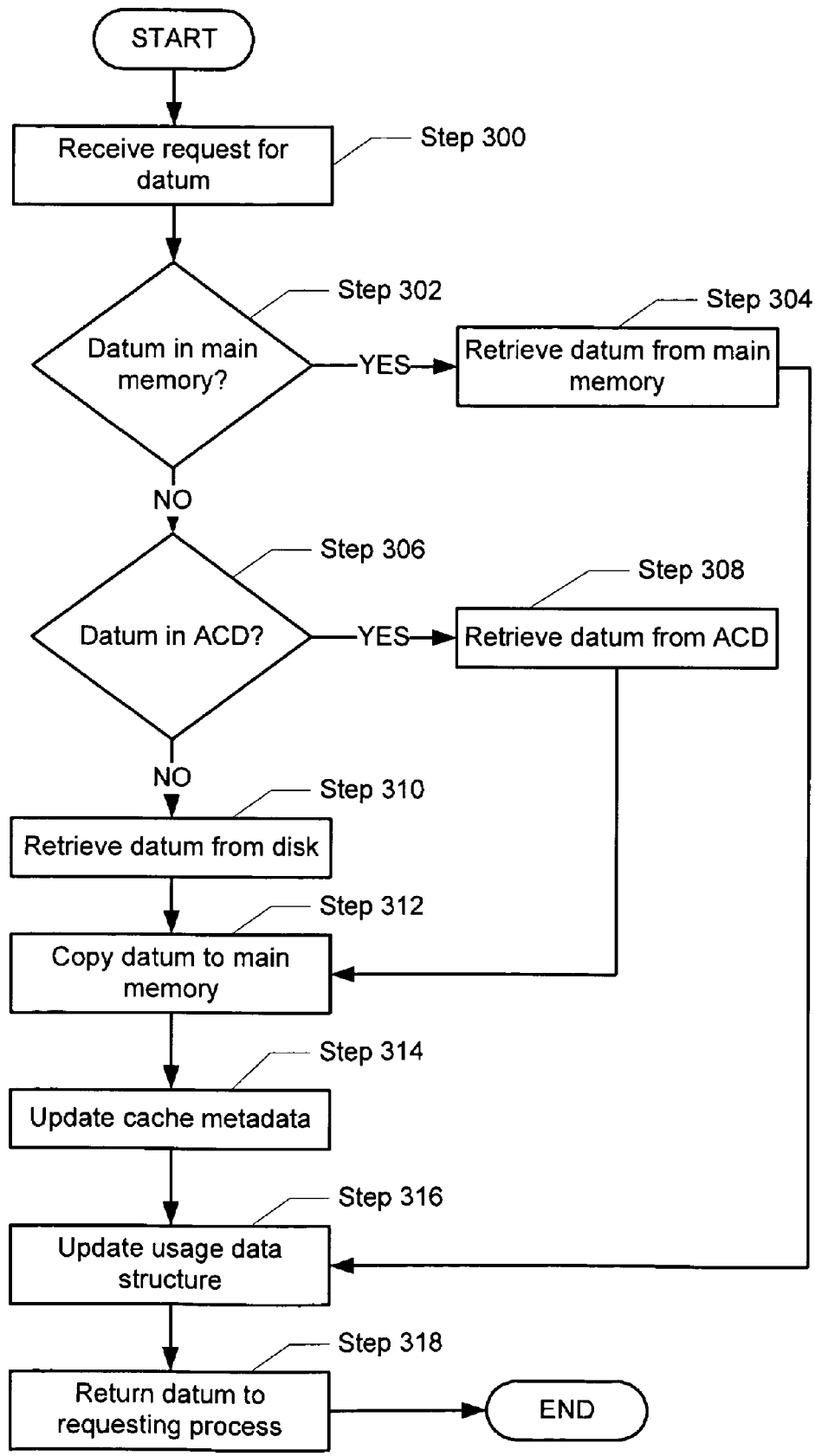
FIGS. 3 and 4 show flowcharts in accordance with one embodiment of the invention.

FIG. 3 shows a flowchart in accordance with one embodiment of the invention. More specifically, FIG. 3 shows a method for retrieving data in accordance with one embodiment of the invention. In one or more embodiments of the invention, one or more of the steps shown in FIG. 3 may be omitted, repeated, and/or performed in a different order. Accordingly, embodiments of the invention should not be considered limited to the specific arrangement of steps shown in FIG. 3.

In Step 300, a request for data is received. In one embodiment of the invention, the request is for a file (or portion thereof) and originates from an application. The file system converts the request into a request for a datum corresponding to the file. In Step 302, a determination is made about whether the datum is located in main memory. In one embodiment of the invention, the determination in Step 302 is made using the cache metadata. In Step 304, the datum is retrieved from main memory if the datum is present in main memory. The process then proceeds to Step 316.

In Step 306, when the datum is not present in main memory a determination is made about whether the datum is located in the ACD. In one embodiment of the invention, the determination in Step 306 is made using the cache metadata. In Step 308, the datum is retrieved from the ACD if the datum is present in main memory. The process then proceeds to Step 312.

In Step 310, if the datum is not present in main memory or in the ACD, then the datum is retrieved from disk. In Step 312, a copy of the datum (i.e., the datum retrieved from the disk) is created and stored in main memory. In Step 314, the cache metadata is updated to indicate that the copy of the datum is stored in main memory. In Step 316, the usage data structure is updated to reflect that the datum has been recently used. In Step 318, the datum is returned to the requesting process (for example, via the file system).

Figure 4:
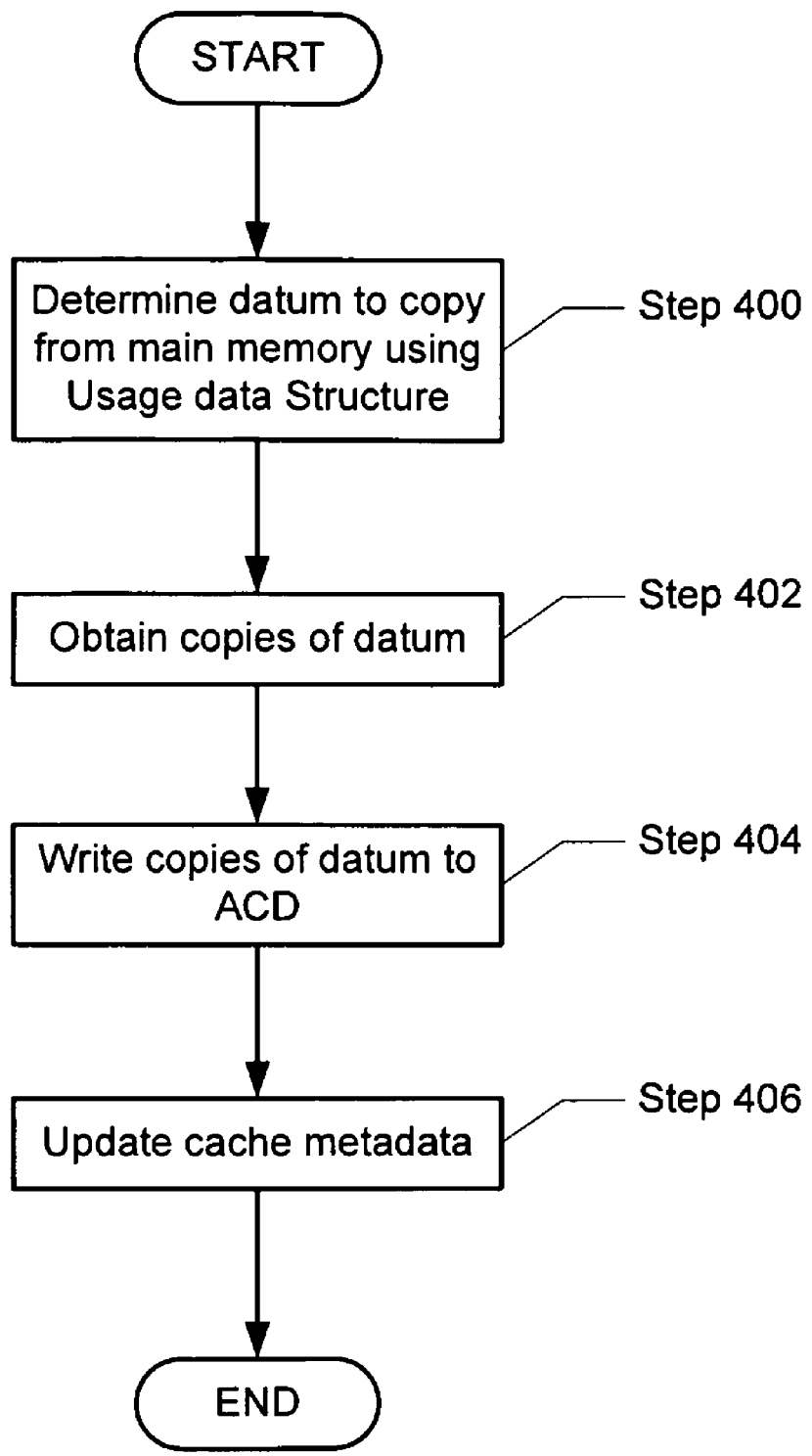

FIG. 4 shows a flowchart in accordance with one embodiment of the invention. More specifically, FIG. 4 shows a method for copying data from main memory to the ACD(s) in accordance with one embodiment of the invention. In one or more embodiments of the invention, one or more of the steps shown in FIG. 4 may be omitted, repeated, and/or performed in a different order. Accordingly, embodiments of the invention should not be considered limited to the specific arrangement of steps shown in FIG. 4.

In Step 400, a determination is made about which datum (or data) to copy from main memory to the ACD using the usage data structure. In one embodiment of the invention, the data identified in Step 400 includes least recently used (or least frequently used) datum. In Step 402, copies of the data are obtained. Step 402 may include creating the copies of the datum identified in Step 400. In Step 404, the copies of the datum are written to the ACD. In one embodiment of the invention, the copies of the datum are written in rotor manner (see FIGS. 5A-5D). In Step 406, the cache metadata is updated to reflect the presence of the newly copied datum in the ACD.

In one embodiment of the invention, the method shown in FIG. 4 may be performed on a per-datum basis such that a datum is identified and copied to the ACD individually. Alternatively, as shown in FIG. 4, an individual datum is identified but written to ACD as a group.

In one embodiment of the invention, the method shown in FIG. 3 is performed by a first thread and the method shown in FIG. 4 is performed by a second thread. Further, the first and second threads execute concurrently. In one embodiment of the invention, the frequency of executing the method shown in FIG. 3 may occur at periodic intervals specified by a user. In one embodiment of the invention, the time elapsed between intervals may be measured in seconds. Further, in one embodiment of the invention, if multiple ACDs are present in the system, then the method shown in FIG. 4 is performed for each ACD. Further, each ACD may be associated with a dedicated thread to perform the method shown in FIG. 4.

As discussed above, the ACD are asymmetric storage devices (i.e., more time is required to perform a write to the ACD as compared to a read to ACD). The methods described in FIGS. 3 and 4 are designed to take advantage of the asymmetric nature of the ACDs. Specifically, by aggregating writes for the ACD, larger blocks of data can be written to the ACDs where the cost of such writes is spread across the larger blocks of data (as compared to writing each individual datum separately). Thus, data can be more efficiently transferred to the ACDs from main memory.

Figure 5A:
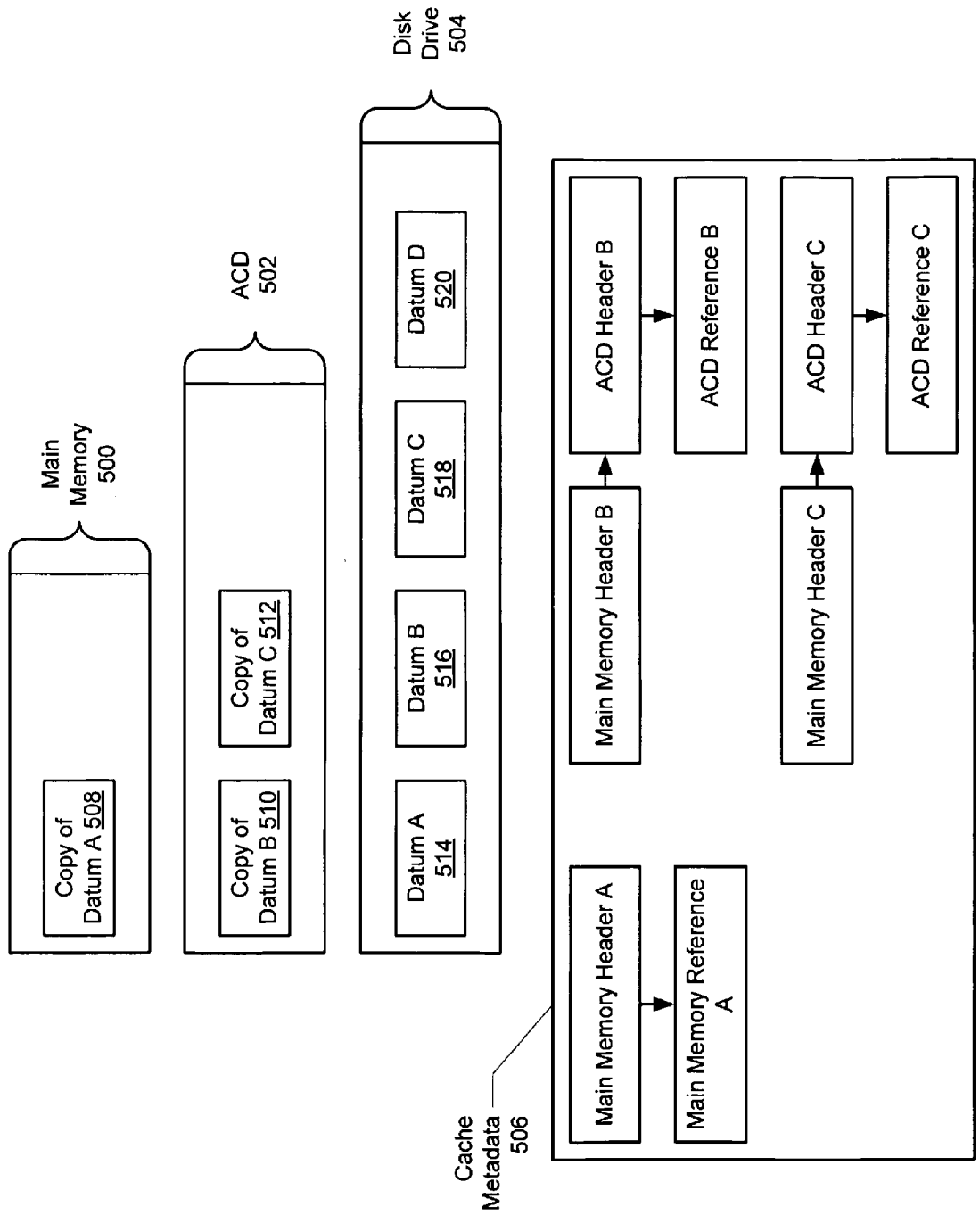

FIGS. 5A-5D show an example in accordance with one embodiment of the invention. The example is not intended to limit the scope of the invention. Turning to the example, referring to FIG. 5A, the system includes a main memory (500), an ACD (502), and a disk (504). The main memory (500) includes a copy of datum A (508), the ACD (502) includes a copy of datum B and a copy of datum C (512), and the disk (504) includes datum A (514), datum B (516), datum C (518), and datum D (520). As shown in FIG. 5A, the cache metadata (506) includes entries for data present in main memory (500) and the ACD (502).

Figure 5B:
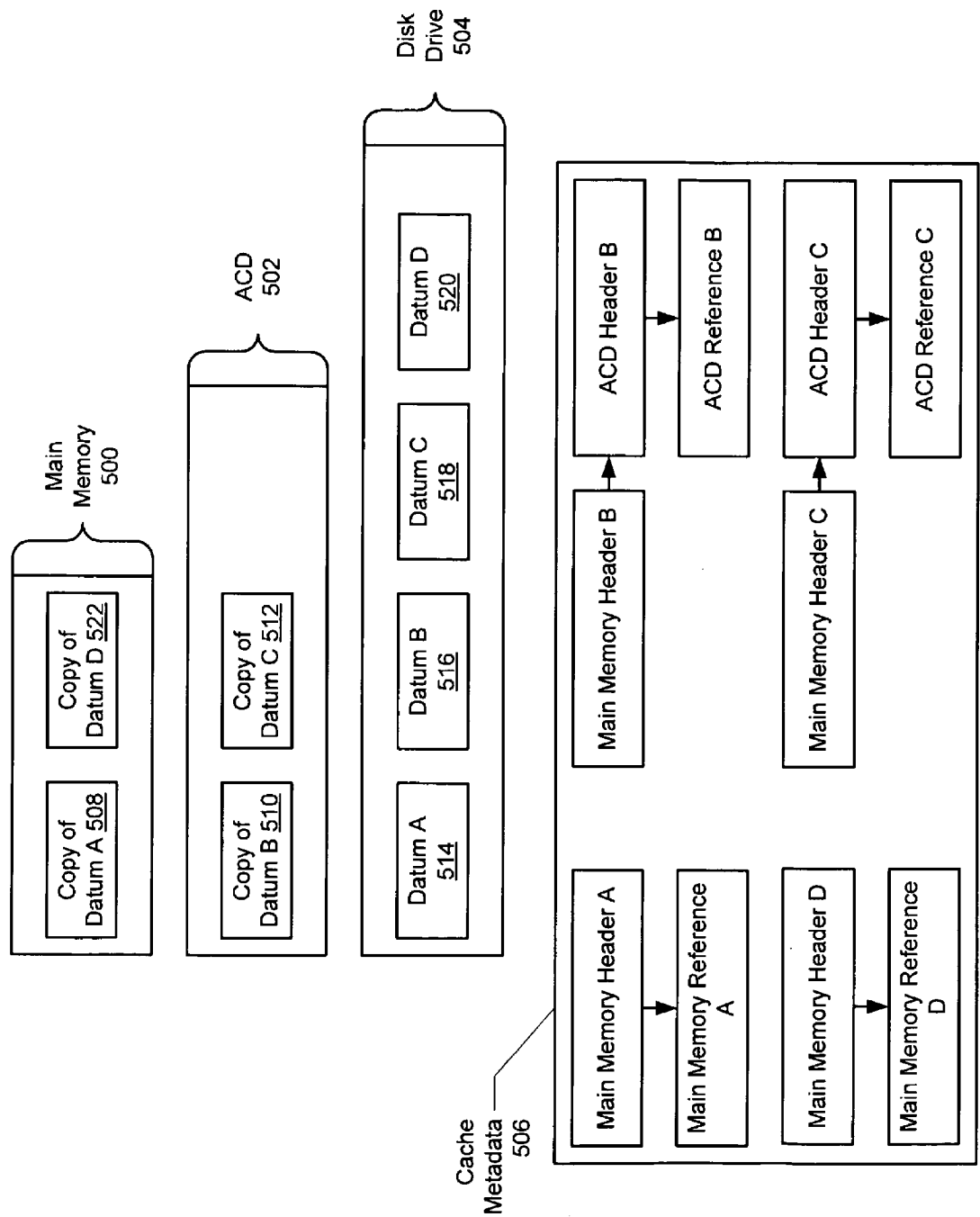

Referring to FIG. 5B, at some later point in time, a request for datum D (520) is received. As datum D (520) is not present in main memory (500) or the ACD (502), a copy of datum D (520) is obtained from disk (504) and copy of datum D (522) is stored in main memory (500). The cache metadata (506) is updated to reflect that a copy of datum D (520) is now present in main memory (500).

Referring to FIG. 5C, at some later point in time, a determination is made using the usage data structure (not shown) to store copies of datum A (514) and datum D (520) in the ACD (502). Accordingly, copies of datum A (514) and datum D (520) are created and stored in the ACD (502). The copies of datum A (514) and datum D (520) are created using the corresponding copies in main memory. For purposes of this example, assume that the ACD (520) can only store three pieces of data. Accordingly, to store copies of datum A (514) and datum D (520), one of the copies of datum currently stored in the ACD (502) must be overwritten. As discussed above, datum is written to the ACD (502) in a rotor fashion and, accordingly, the copy of datum B (510) is overwritten with the copy of datum D (521).

While the copies of datum A (514) and datum D (520) are being written to the ACD, the copy of datum D (522) in main memory (500) becomes dirty. As discussed above, in one embodiment of the invention, the ACD only stores clean data. Accordingly, in this scenario, copies of datum A (514) and datum D (520) are both written to the ACD, but the copy of datum D (524), which is now dirty, is not accessible as the cache metadata is updated (if necessary) to reflect that there is no copy of datum D (524) in the ACD (502). Said another way, if a datum becomes dirty during the writing process, the writing process is not interrupted and the dirty datum is written to the ACD. However, the dirty datum is not accessible as the cache metadata is not updated to include the appropriate ACD header or ACD reference.

Figure 5D:
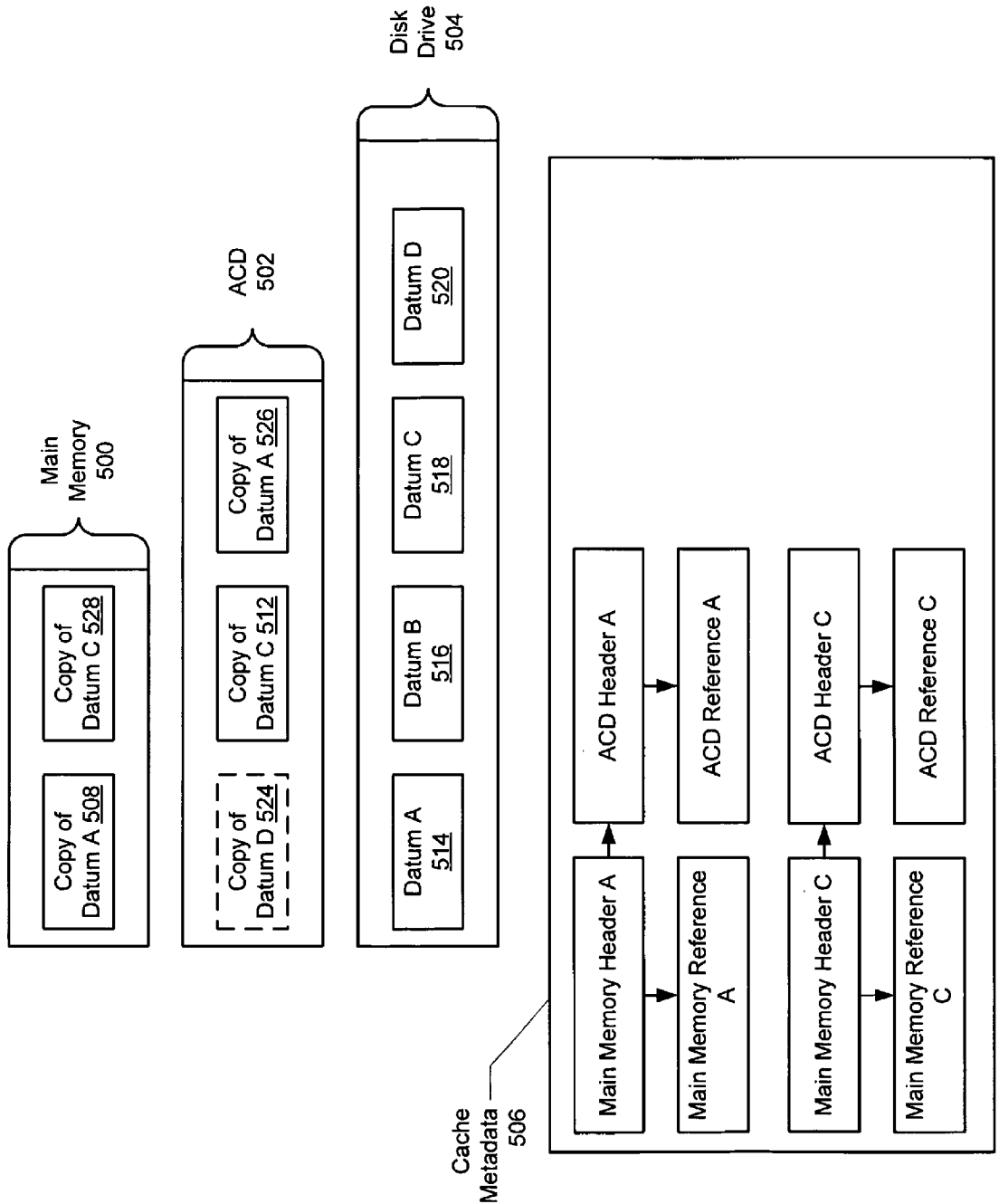

Referring to FIG. 5D, at some later point in time, a request for datum C (512) is received. When the request is received, datum C (or a copy thereof) is only present in the ACD (502) and the disk (504). Accordingly, a copy of datum C (528) is created and stored in main memory (500). For the purposes of this example, the storage capacity of main memory (500) is two data. Accordingly, the copy of datum C (528) overwrites the copy of datum D (522). The cache metadata (506) is updated to indicate the presence of copies of datum C (512, 528) in both main memory (500) and the ACD (502). Further, the cache metadata (506) is updated to indicate that the copy of datum D (522) is no longer present in main memory (500).

The following is another example of the invention. The example is not intended to limit the scope of the application. In this example, the system includes nine disks (denoted as c6t0d0-c6t8d0) and implements a RAID-type policy. Initially, the system does not include any ACDs. The following is a summary of the I/O activity with the above configuration:

TABLE 1

| | I/O Activity without ACDs | | | | | |
|---|---|---|---|---|---|---|
| | capacity | | operations | | bandwidth | |
| pool | used | avail | read | write | read | write |
| pool | 56.5G | 6.07T | 164 | 0 | 817K | 0 |
| raidz1 | 56.5G | 6.07T | 164 | 0 | 817K | 0 |
| c6t0d0 | — | — | 97 | 0 | 1012K | 0 |
| c6t1d0 | — | — | 96 | 0 | 980K | 0 |

TABLE 1-continued

I/O Activity without ACDs

| pool | capacity | | operations | | bandwidth | |
| --- | --- | --- | --- | --- | --- | --- |
| | used | avail | read | write | read | write |
| c6t2d0 | — | — | 96 | 0 | 1022K | 0 |
| c6t3d0 | — | — | 97 | 0 | 991K | 0 |
| c6t4d0 | — | — | 96 | 0 | 1.01M | 0 |
| c6t5d0 | — | — | 97 | 0 | 925K | 0 |
| c6t6d0 | — | — | 97 | 0 | 976K | 0 |
| c6t7d0 | — | — | 96 | 0 | 991K | 0 |
| c6t8d0 | — | — | 96 | 0 | 960K | 0 |

As shown in Table 1, the nine disks support an aggregate read operations of 164 reads/second. The value for read operations is listed on the denoted with the label "pool" and is the number of read operations satisfied from the pool of disks. Table 1 also includes additional information about the read operations occurring on each disk within the pool. At a later point in time, two ACDs (i.e., c6t9d0, c6t10d0) are added to the system. The following is a summary of the initial I/O activity after the ACDs have been added:

TABLE 2

Initial I/O Activity with ACDs

| pool | capacity | | operations | | bandwidth | |
| --- | --- | --- | --- | --- | --- | --- |
| | used | avail | read | write | read | write |
| pool | 56.5G | 6.07T | 159 | 0 | 850K | 0 |
| raidz1 | 56.5G | 6.07T | 159 | 0 | 850K | 0 |
| c6t0d0 | — | — | 100 | 0 | 949K | 0 |
| c6t1d0 | — | — | 100 | 0 | 801K | 0 |
| c6t2d0 | — | — | 98 | 0 | 792K | 0 |
| c6t3d0 | — | — | 99 | 0 | 830K | 0 |
| c6t4d0 | — | — | 100 | 0 | 794K | 0 |
| c6t5d0 | — | — | 98 | 0 | 793K | 0 |
| c6t6d0 | — | — | 100 | 0 | 893K | 0 |
| c6t7d0 | — | — | 100 | 0 | 1005K | 0 |
| c6t8d0 | — | — | 98 | 0 | 885K | 0 |
| cache | — | — | — | — | — | — |
| c6t9d0 | 42.2M | 16.9G | 0 | 4 | 0 | 106K |
| c6t10d0 | 46.5M | 16.9G | 0 | 6 | 0 | 131K |

As shown in Table 2, when the ACDs are initially added to the system, data is copied from main memory (not shown) to the ACDs (as denoted by the write operations occurring on the ACDs). As time passes, the ACDs are populated with data obtained from main memory. At this point, the ACDs include a total of 86.7 Mbytes of cached data as shown under the "used" column for cache devices in Table 2. The following is a summary of the I/O activity after the ACDs have been populated with data from main memory:

TABLE 3

I/O Activity with populated ACDs

| pool | capacity | | operations | | bandwidth | |
| --- | --- | --- | --- | --- | --- | --- |
| | used | avail | read | write | read | write |
| pool | 56.5G | 6.07T | 113 | 0 | 905K | 0 |
| raidz1 | 56.5G | 6.07T | 113 | 0 | 905K | 0 |
| c6t0d0 | — | — | 98 | 0 | 98.8K | 0 |
| c6t1d0 | — | — | 100 | 0 | 101K | 0 |
| c6t2d0 | — | — | 101 | 0 | 102K | 0 |
| c6t3d0 | — | — | 101 | 0 | 101K | 0 |
| c6t4d0 | — | — | 101 | 0 | 101K | 0 |
| c6t5d0 | — | — | 100 | 0 | 101K | 0 |

TABLE 3-continued

I/O Activity with populated ACDs

| pool | capacity | | operations | | bandwidth | |
| --- | --- | --- | --- | --- | --- | --- |
| | used | avail | read | write | read | write |
| c6t6d0 | — | — | 100 | 0 | 101K | 0 |
| c6t7d0 | — | — | 99 | 0 | 99.8K | 0 |
| c6t8d0 | — | — | 100 | 0 | 100K | 0 |
| cache | — | — | — | — | — | — |
| c6t9d0 | 16.7G | 253M | 126 | 2 | 1020K | 138K |
| c6t10d0 | 16.7G | 263M | 132 | 3 | 1.05M | 167K |

As shown in Table 3, after the ACDs have been populated, the read operations increase to 371 reads/second and the ACDs now include a total of 33.4 Gbytes of cached data. Specifically, the ACDs account for 258 reads/second (the aggregate of 126 reads/second and 132 reads/second) and the disks account for 113 reads/second (as shown on the denoted with the label "pool"). Thus, in this example, the inclusion of the ACDs more doubles the read operations/second as compared with the system without the ACDs (see Table 1).

The invention (or portions thereof), may be implemented on virtually any type of system regardless of the platform being used. For example, the system may include a processor, associated memory, a storage device, and numerous other elements and functionalities typical of today's computers (not shown). The system may also include input means, such as a keyboard and a mouse, and output means, such as a monitor. The system is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned system may be located at a remote location and connected to the other elements over a network. Further, the invention may be implemented on a distributed system having a plurality of nodes, where each portion of the invention may be located on a different node within the distributed system. In one embodiment of the invention, the node corresponds to a system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for storing data, comprising:
 a main memory comprising a cache metadata, wherein the main memory comprises random access memory (RAM), and wherein the main memory comprises a first datum; and
 an asymmetric cache device (ACD), wherein the ACD comprises flash-type memory;

wherein the system is configured to:
(a) receive a first request for a second datum;
(b) query the cache metadata to determine that the second datum is present in the ACD and not present in the main memory;
in response to the determination:
(c) retrieve the second datum from the ACD;
(d) store a copy of the second datum in the main memory;
(e) update the cache metadata to indicate that the copy of the second datum is stored in the main memory;
(f) identify that the first datum is to be copied to the ACD using a usage data structure, wherein the usage data structure is located in the main memory and tracks a frequency of requests for the first datum;
(g) create a copy of the first datum;
(h) store the copy of the first datum in the ACD;
(i) update the cache metadata to indicate the copy of the first datum is located in both the main memory and the ACD;
(j) receive a third request for a third datum and a fourth request for a fourth datum;
(k) query the cache metadata to determine that the third datum and fourth datum are present in the main memory and not present in the ACD;
(l) create a copy of the third datum and the fourth datum;
(m) store the copy of the third datum in the ACD;
(n) update the cache metadata to indicate the copy of the third datum is stored in the ACD;
(o) initiate storing the copy of the fourth datum in the ACD;
(p) receive, after initiating, an indication the fourth datum in the main memory is dirty; and
(q) store the copy of the fourth datum in the ACD, wherein the cache metadata is not updated to indicate that the copy of the fourth datum is stored in the ACD.

2. The system of claim 1, further configured to:
store the copy of the first datum in the main memory when the first datum is not present in the ACD and is not present in the main memory; and
update the cache metadata to indicate that the copy of the first datum is stored in the main memory when the first datum is not present in the ACD and is not present in the main memory.

3. The system of claim 1, further comprising:
a file system configured to:
receive a second request for a file, and
generate the first request for the first datum, wherein the first datum corresponds to at least a portion of the file.

4. The system of claim 1, wherein the system further comprises a disk, wherein a storage capacity of the main memory is less than a storage capacity of the ACD, and wherein the storage capacity of the ACD is less than a storage capacity of the disk.

5. The system of claim 1, wherein steps (a)-(e) are performed by a first thread and steps (f)-(i) are performed by a second thread, and wherein the first thread and second thread execute concurrently.

6. The system of claim 1, further configured to:
determine that the frequency of requests for the first datum is less than a threshold; and
identify that the first datum in main memory is a candidate for eviction from the main memory.

7. The system of claim 1, further configured to:
identify, in the cache metadata, a main memory header for the first datum comprising a pointer to a main memory reference for the first datum; and
determine that the first datum is present in the main memory based on the main memory header and the main memory reference.

8. The system of claim 7, further configured to:
identify, in the cache metadata, a first pointer of the main memory header to an ACD header for the first datum;
identify, in the cache metadata, a second pointer of the ACD header to an ACD reference for the first datum; and
determine that the first datum is present in the ACD and present in the main memory based on the main memory header, the ACD header, and the ACD reference.

9. The system of claim 1, further configured to:
identify, in the cache metadata, a main memory header for the second datum comprising a first pointer to an ACD header for the second datum;
identify, in the cache metadata, a second pointer of the ACD header to an ACD reference for the second datum; and
determine that the second datum is not present in the main memory and is present in the ACD based on the main memory header, the ACD header, and the ACD reference.

10. A method for storing data, comprising:
(a) receiving a first request for a second datum;
(b) querying a cache metadata to determine that the second datum is present in an asymmetric cache device (ACD) and not present in a main memory, wherein the ACD comprises flash-type memory, wherein the main memory comprises random access memory (RAM), and wherein the main memory comprises a first datum;
(c) retrieving the second datum from the ACD;
(d) storing a copy of the second datum in the main memory;
(e) updating the cache metadata to indicate that the copy of the second datum is stored in the main memory;
(f) identifying that the first datum is to be copied to the ACD using a usage data structure, wherein the usage data structure is located in the main memory and tracks a frequency of requests for the first datum;
(g) creating a copy of the first datum;
(h) storing the copy of the first datum in the ACD;
(i) updating the cache metadata to indicate the copy of the first datum is located in both the main memory and the ACD;
(j) receiving a third request for a third datum and a fourth request for a fourth datum;
(k) querying the cache metadata to determine that the third datum and fourth datum are present in the main memory and not present in the ACD;
(l) creating a copy of the third datum and the fourth datum;
(m) storing the copy of the third datum in the ACD;
(n) updating the cache metadata to indicate the copy of the third datum is stored in the ACD;
(o) initiating storing the copy of the fourth datum in the ACD;
(p) receiving, after initiating, an indication the fourth datum in the main memory is dirty; and
(q) storing the copy of the fourth datum in the ACD, wherein the cache metadata is not updated to indicate that the copy of the fourth datum is stored in the ACD.

11. The method of claim 10, further comprising:
storing the copy of the first datum in the main memory when the first datum is not present in the ACD and is not present in the main memory; and
updating the cache metadata to indicate that the copy of the first datum is stored in the main memory when the first datum is not present in the ACD and is not present in the main memory.

12. The method of claim 10, further comprising:
receiving a second request for a file by a file system; and
generating the first request for the first datum, wherein the first datum corresponds to at least a portion of the file.

13. The method of claim 10, wherein a storage capacity of the main memory is less than a storage capacity of the ACD and wherein the storage capacity of the ACD is less than a storage capacity of the disk.

14. The method of claim 10, further configured to:
identifying, in the cache metadata, a main memory header for the first datum comprising a pointer to a main memory reference for the first datum; and
determining that the first datum is present in the main memory based on the main memory header and the main memory reference.

15. The method of claim 14, further configured to:
identifying, in the cache metadata, a first pointer of the main memory header to an ACD header for the first datum;
identifying, in the cache metadata, a second pointer of the ACD header to an ACD reference for the first datum; and
determining that the first datum is present in the ACD and present in the main memory based on the main memory header, the ACD header, and the ACD reference.

16. The method of claim 10, further configured to:
identifying, in the cache metadata, a main memory header for the second datum comprising a first pointer to an ACD header for the second datum;
identifying, in the cache metadata, a second pointer of the ACD header to an ACD reference for the second datum; and
determining that the second datum is not present in the main memory and is present in the ACD based on the main memory header, the ACD header, and the ACD reference.

17. A non-transitory computer readable medium storing instructions for storing data, the instructions executable on a processor and comprising functionality for:
(a) receiving a first request for a second datum;
(b) querying a cache metadata to determine that the second datum is present in an asymmetric cache device (ACD) and not present in a main memory, wherein the ACD comprises flash-type memory, wherein the main memory comprises random access memory (RAM), and wherein the main memory comprises a first datum;
(c) retrieving the second datum from the ACD;
(d) storing a copy of the second datum in the main memory;
(e) updating the cache metadata to indicate that the copy of the second datum is stored in the main memory;
(f) identifying that the first datum is to be copied to the ACD using a usage data structure, wherein the usage data structure is located in the main memory and tracks a frequency of requests for the first datum;
(g) creating a copy of the first datum;
(h) storing the copy of the first datum in the ACD;
(i) updating the cache metadata to indicate the copy of the first datum is located in both the main memory and the ACD;
(j) receiving a third request for a third datum and a fourth request for a fourth datum;
(k) querying the cache metadata to determine that the third datum and fourth datum are present in the main memory and not present in the ACD;
(l) creating a copy of the third datum and the fourth datum;
(m) storing the copy of the third datum in the ACD;
(n) updating the cache metadata to indicate the copy of the third datum is stored in the ACD;
(o) initiating storing the copy of the fourth datum in the ACD;
(p) receiving, after initiating, an indication the fourth datum in the main memory is dirty; and
(q) storing the copy of the fourth datum in the ACD, wherein the cache metadata is not updated to indicate that the copy of the fourth datum is stored in the ACD.

18. The non-transitory computer readable medium of claim 17, wherein steps (a)-(e) are performed by a first thread and steps (f)-(i) are performed by a second thread, and wherein the first thread and second thread execute concurrently.

* * * * *